(12) United States Patent
Kim et al.

(10) Patent No.: US 10,291,307 B2
(45) Date of Patent: May 14, 2019

(54) APPARATUS AND METHOD FOR FEEDBACK OF CHANNEL STATE INFORMATION IN WIRELESS COMMUNICATION SYSTEM

(71) Applicants: Samsung Electronics Co., Ltd., Suwon-si, Gyeonggi-do (KR); PURDUE RESEARCH FOUNDATION, West Lafayette, IN (US)

(72) Inventors: Taeyoung Kim, Seoul (KR); David J. Love, West Lafayette, IN (US); Jun-Il Choi, West Lafayette, IN (US); Jiyun Seol, Seongnam-si (KR); Keonkook Lee, Suwon-si (KR)

(73) Assignees: Samsung Electronics Co., Ltd., Suwon-si (KR); Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 15/562,760

(22) PCT Filed: Mar. 31, 2016

(86) PCT No.: PCT/KR2016/003309
§ 371 (c)(1),
(2) Date: Sep. 28, 2017

(87) PCT Pub. No.: WO2016/159675
PCT Pub. Date: Oct. 6, 2016

(65) Prior Publication Data
US 2018/0083683 A1    Mar. 22, 2018

Related U.S. Application Data

(60) Provisional application No. 62/140,887, filed on Mar. 31, 2015.

(30) Foreign Application Priority Data

Mar. 28, 2016 (KR) .................. 10-2016-0036900

(51) Int. Cl.
  *H04B 7/06* (2006.01)
  *H04B 7/0456* (2017.01)
  (Continued)

(52) U.S. Cl.
  CPC ......... *H04B 7/0626* (2013.01); *H04B 7/0478* (2013.01); *H04B 7/0639* (2013.01); *H04B 7/0413* (2013.01); *H04W 84/042* (2013.01)

(58) Field of Classification Search
  CPC .. H04B 7/0617; H04B 7/0626; H04B 7/0478; H04B 7/0621
  See application file for complete search history.

(56) References Cited

U.S. PATENT DOCUMENTS

2009/0086842 A1   4/2009   Shi et al.
2011/0292926 A1   12/2011   Clerckx et al.
(Continued)

FOREIGN PATENT DOCUMENTS

KR   10-2011-0132189 A   12/2011
KR   10-2012-0114350 A   10/2012
(Continued)

OTHER PUBLICATIONS

Byungju Lee, Junil Choi, Ji-yun Seol, David J. Love, and Byonghyo Shim, Antenna Grouping based Feedback Reduction for FDD-based Massive MIMO Systems, Korea University, Purdue University, Samsung, 2014, IEEE.*

(Continued)

*Primary Examiner* — Aristocratis Fotakis
(74) *Attorney, Agent, or Firm* — Jefferson IP Law, LLP

(57) ABSTRACT

The disclosure relates to a pre-5$^{th}$-Generation (5G) or 5G communication system to be provided for supporting higher
(Continued)

data rates Beyond 4$^{th}$-Generation (4G) communication system such as Long Term Evolution (LTE). A feedback transmission method for a receiving device in a multiple input multiple output system according to one embodiment comprises: a step of measuring channel state information; a first quantization step of quantizing the channel state information using a first codebook; a second quantization step of quantizing the channel state information using second and third codebooks which are different from the first codebook; and a step of feeding back the channel state information on the basis of a selection result of one of the first and second quantization steps.

18 Claims, 9 Drawing Sheets

(51) Int. Cl.
*H04B 7/0413* (2017.01)
*H04W 84/04* (2009.01)

(56) References Cited

U.S. PATENT DOCUMENTS

| | | | |
|---|---|---|---|
| 2013/0034179 A1 | 2/2013 | Zhang et al. | |
| 2013/0308715 A1 | 11/2013 | Nam et al. | |
| 2014/0029684 A1* | 1/2014 | Shirani-Mehr | H04B 7/0469 375/267 |
| 2014/0177745 A1* | 6/2014 | Krishnamurthy | H04B 7/0413 375/267 |
| 2014/0177749 A1 | 6/2014 | Wu et al. | |
| 2016/0373175 A1* | 12/2016 | Harrison | H04B 7/0469 |
| 2017/0012689 A1* | 1/2017 | Li | H04L 1/0026 |
| 2017/0302345 A1* | 10/2017 | Kakishima | H04B 7/0417 |
| 2018/0198500 A1* | 7/2018 | Choi | H04B 7/0478 |

FOREIGN PATENT DOCUMENTS

| | | |
|---|---|---|
| KR | 10-2015-0022857 A | 3/2015 |
| WO | 2014/138525 A1 | 9/2014 |

OTHER PUBLICATIONS

Junil Choi, Taeyoung Kim, David J. Love, and Ji-yun Seol, Exploiting the preferred domain of FDD massive MIMO systems with uniform planar arrays, Purdue University and Samsung, Jun. 8-12, 2015, IEEE.*

Jiho Song, Junil Choi, Stephen G. Larew, David J. Love, Timothy A. Thomas, and Amitava Ghosh, Adaptive Millimeter Wave Beam Alignment for Dual-Polarized MIMO Systems, Purdue University, Nokia, Jan. 2015, IEEE.*

Junil Choi; Keonkook Lee; David J. Love; Taeyoung Kim; Robert W. Heath, "Advanced Limited Feedback Designs for FD-MIMO Using Uniform Planar Arrays", University of Texas, Samsung and Purdue University, IEEE, Dec. 6-10, 2015.*

3GPP, 3rd Generation Partnership Project; Technical Specification Group Radio Access Network; Study on 3D channel model for LTE (Release 12), 3GPP TR 36.873, Sep. 2014, V12.0.0, Sophia Antipolis, France.

* cited by examiner

APPARATUS AND METHOD FOR FEEDBACK OF CHANNEL STATE INFORMATION IN WIRELESS COMMUNICATION SYSTEM

PRIORITY

This application is a National Phase Entry of PCT International Application No. PCT/KR2016/003309, which was filed on Mar. 31, 2016, and claims a priority to U.S. Provisional Patent Application No. 62/140,887, which was filed on Mar. 31, 2015, and Korean Patent Application No. 10-2016-0036900, which was filed on Mar. 28, 2016, the contents of which are incorporated herein by reference.

TECHNICAL FIELD

The present invention relates to a wireless communication system, and more particularly to an apparatus and a method for feedback of channel state information.

BACKGROUND ART

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The performance of the wireless communication system may significantly increase through the use of channel information by a transmission device. In the case of a Time Division Duplexing (TDD) system, a transmitter may directly acquire channel information from an uplink channel. However, in the case of a Frequency Division Duplexing (FDD) system, since an uplink channel and a downlink channel use different frequencies, the channels of the two links are independent from each other and a transmission device should acquire channel information from a reception device. At this time, the number of uplink channels are limited in the real system, and thus the reception device should quantize its own channel information in a predetermined size and transmit the quantized channel information.

System performance deteriorates due to quantization errors, and this phenomenon is true especially in a multiple-user multiple-antenna channel in which the transmission device services a plurality of users at the same time. Accordingly, an efficient channel feedback scheme under a limited feedback size is required.

DETAILED DESCRIPTION OF THE INVENTION

Technical Problem

An embodiment provides an apparatus and a method for feedback of channel state information in a Full-Dimension Multiple-Input Multiple-Output (FD-MIMO) communication system.

Another embodiment provides a method of quantizing channel state information.

Another embodiment provides a method of quantizing channel state information using Kronecker-Product (KR) codebooks.

Another embodiment provides a method of improving Kronecker-Product codebooks for quantization of channel state information.

Another embodiment provides a method using a plurality of codewords to improve Kronecker-Product codebooks.

Another embodiment provides a method of designing a new codeword to improve Kronecker-Product codebooks.

Technical Solution

In accordance with an aspect of the present invention, a method of transmitting feedback in a multiple-input multiple-output system is provided. The method includes: measuring channel state information; performing first quantization of quantizing the channel state information using a first codebook; performing second quantization of quantizing the channel state information using second and third codebooks, which are different from the first codebook; and feeding back the channel state information based on a result of selection of one of the first quantization and the second quantization.

In accordance with another aspect of the present invention, a method of receiving feedback by a transmission device in a multiple-input multiple-output system is provided. The method includes: receiving feedback of channel state information, wherein the feedback information is determined through a process of performing first quantization on the channel state information using a first codebook, performing second quantization on the channel state information using second and third codebooks, which are different from the first codebook, and selecting one of the first quantization and the second quantization through comparison between the first quantization and the second quantization.

In accordance with another aspect of the present invention, a reception device for transmitting feedback in a multiple-input multiple-output system is provided. The reception device includes: a channel estimation unit configured to measure channel state information; a controller configured to perform first quantization on the channel state information using a first codebook, perform second quantization on the channel state information using second and third codebooks different from the first codebook, and select one of the first quantization and the second quantization; and a communication unit configured to feed back the channel state information based on a result of the selection.

In accordance with another aspect of the present invention, a reception device for receiving feedback in a multiple-input multiple-output system is provided. The reception device includes: a communication unit for performing wireless communication; and a controller configured to receive feedback of channel state information, wherein the feedback information is determined through a process of performing first quantization on the channel state information using a first codebook, performing second quantization on the channel state information using second and third codebooks, which are different from the first codebook, and selecting one of the first quantization and the second quantization through comparison between the first quantization and the second quantization.

Effects of the Invention

According to an embodiment of the present specification, it is possible to provide reliable feedback of channel state information while maintaining small feedback overhead.

MODE FOR CARRYING OUT THE INVENTION

Hereinafter, exemplary embodiments of the present invention will be described with reference to the accompanying drawings. Further, in the following description of the present invention, a detailed description of known functions or configurations incorporated herein will be omitted when it may make the subject matter of the present invention rather unclear. Further, terms described later are defined in consideration of functions of the present invention, but may vary according to the intention or convention of a user or operator. Therefore, the definitions of the terms should be made based on the contents throughout the specification.

Hereinafter, a method and an apparatus of the present invention for providing feedback for Channel State Information (CSI) in a broadband wireless communication system will be described. For convenience of description, the present invention uses terms and names defined in the $3^{rd}$-Generation Partnership Project (3GPP) Rel. 13 standard, but is not limited thereto, and may be equally applied to a system following a different standard. Terms referring to control information used in the following description, terms referring to network entities, terms referring to messages, and terms referring to elements of the device are employed for convenience of the description. Accordingly, the present disclosure is not limited to these terms, and other terms having the same technical meaning may be used.

Figure 1:
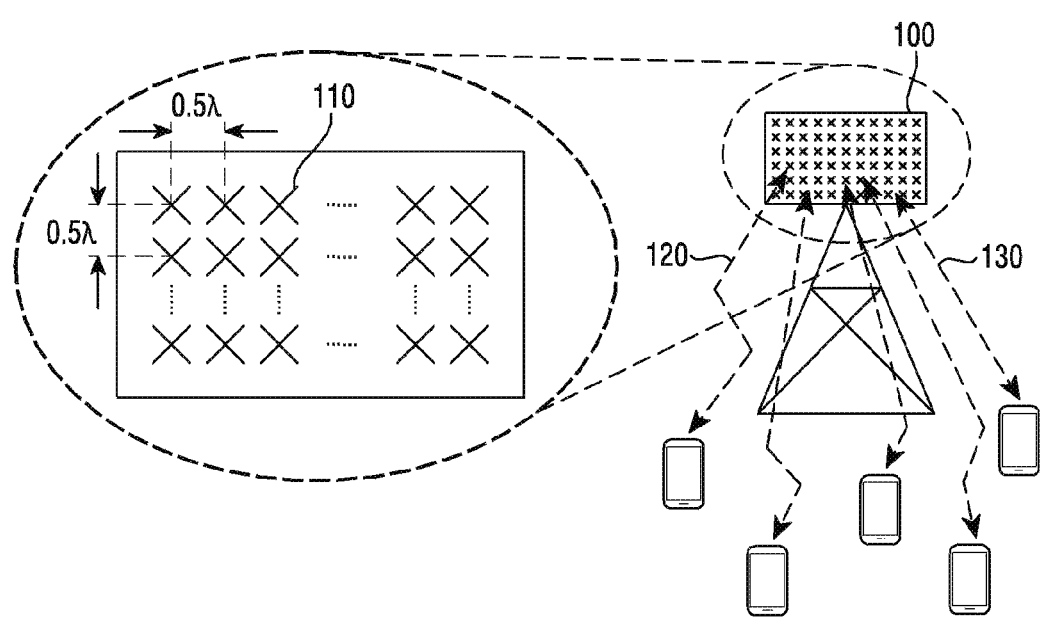
FIG. 1 illustrates a Full-Dimension Multiple-Input Multiple-Output (FD-MIMO) system according to the present disclosure.

FIG. 1 illustrates a Full-Dimension Multiple-Input Multiple-Output (FD-MIMO) system according to the present disclosure. In this specification, the FD-MIMO system refers to a wireless communication system that transmits data utilizing several tens or more of transmission antennas. Referring to FIG. 1, a Base Station (BS) transmission device 100 may transmit a wireless signal using several tens or more of transmission antennas. A plurality of transmission antennas 110 may be arranged to maintain a minimum distance therebetween. The minimum distance may be half the wavelength of the transmitted wireless signal according to an embodiment. When a distance corresponding to half the wavelength of the wireless signal is generally kept between the transmission antennas 110, the signal transmitted by each transmission antenna may be influenced by a wireless channel having a low correlation therewith.

The several tens or more of transmission antennas 110 arranged at the BS transmission device 100 in FIG. 1 may be used for transmitting signals to one or more terminals 120 and 130. Proper precoding may be applied to the plurality of transmission antennas 110. The BS transmission device 100 may simultaneously transmit the signals to the plurality of terminals.

In FIG. 1, one terminal may receive one or more information streams. In general, the number of information streams that one terminal can receive is determined according to the number of reception antennas that the terminal has and according to a channel state.

In order to effectively implement the FD-MIMO system, the terminal is required to accurately measure a channel state and an interference size and transmit effective channel state information to the BS. The BS, having received the channel state information, may determine terminals to which the BS transmits data in connection with downlink transmission, a data transmission rate at which the BS transmits data, and precoding to be applied. In the FD-MIMO system, when a conventional method of transmitting/receiving channel state information in the Long Term Evolution (LTE)/LTE-Advanced (LTE-A) system is applied due to a large number of transmission antennas, an uplink overhead problem, in which a large amount of control information must be transmitted through the uplink, is created. The present disclosure aims to provide an apparatus and a method for feeding back channel state information while maintaining a predetermined level of overhead in the FD-MIMO system.

Figure 2:
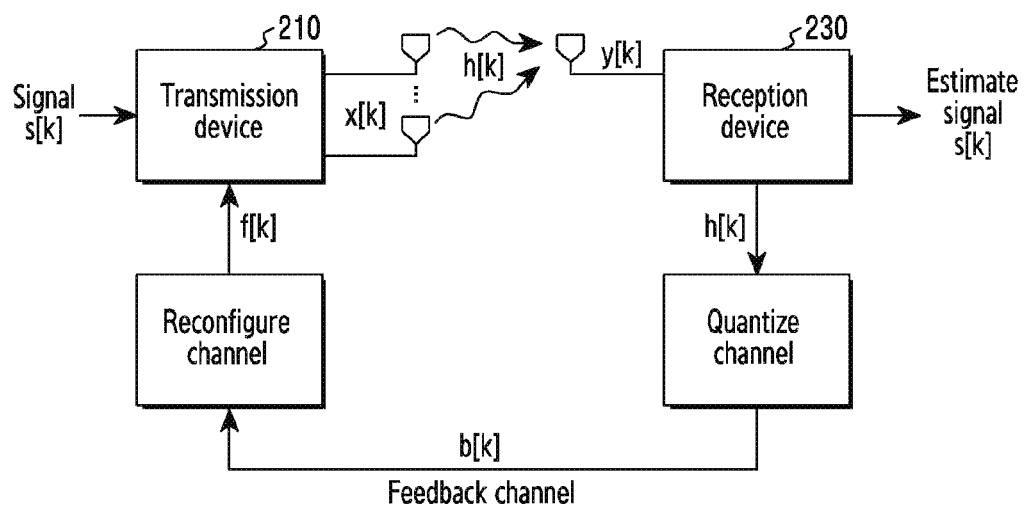
FIG. 2 illustrates the flow of a signal for feedback of channel state information between a transmission device and a reception device according to the present disclosure.

FIG. 2 illustrates the flow of a signal for feedback of channel state information between a transmission device and a reception device according to the present disclosure. According to an embodiment, a transmission device 210 of FIG. 2 may correspond to the BS transmission device of FIG. 1. Further, according to an embodiment, a reception device 230 of FIG. 2 may correspond to one of the terminal devices of FIG. 1. For simplification of the description, FIG. 2 assumes that a system including the transmission device 210 includes a plurality of antennas, but the reception device 230 includes a single antenna. However, according to another embodiment, the reception device 230 may include a plurality of antennas, like the transmission device 210.

Referring to FIG. 2, the transmission device 210 may process a signal s[k] for transmission and transmit the signal s[k] as a signal x[k]. The reception device 230 may estimate the signal s[k] from a reception signal y[k] and quantize a channel vector h[k], so as to generate a binary vector b[k] of a $B_{tot}$ dimension. Here, $B_{tot}$ refers to overhead for feedback of channel state information. The generated binary vector b[k] may be transmitted to the transmission device 210 as channel state information through a feedback channel. The transmission device 210 may receive the channel state information fed back by the reception device 230 and configure a beamforming channel vector f[k] based on the feedback information.

In a Frequency Division Duplexing (FDD) system, there is a feedback link from the reception device 230 to the transmission device 210 for feedback of channel state information. However, the size of the feedback link is limited. Most limited feedback systems, including 3rd Generation Partnership Project (3GPP) Long-Term-Evolution (LTE), are dependent on a normal Vector Quantized (VQ) codebook $C=\{c_1, c_2, \ldots, c_{2B_{tot}}\}$ for feedback of channel state information. The VQ codebook is shared between the transmission device 210 and the reception device 230. $c_i$ denotes an N×1 complex vector that satisfies $\|c_i\|^2=1$ for all i. In a VQ codebook approach, the reception device 230 may select an optimal codeword through an exhaustive search using Equation (1) below.

$$c_{opt} = \underset{c \in C}{\arg\max} |h^H c|^2 \quad \text{Equation (1)}$$

In Equation (1), $c_{opt}$ denotes an optimal codeword selected through quantization, h denotes an N×1 overall channel vector, and c denotes a codeword included in a codebook C.

However, the exhaustive search using Equation (1) above is feasible only when the total number of codewords is small. This is because computational complexity of the exhaustive search to search for an optimal codeword exponentially increases according to $B_{tot}$. That is, when the total number of codewords $B_{tot}$ is 4, as in the LTE system, it is possible to perform the exhaustive search of the optimal codeword through Equation (1) above. However, when $B_{tot}$ is relatively large according to an increase in the number of antennas of the transmission device, the reception device 230 cannot perform the exhaustive search using Equation (1) in real time. Further, in order to make a channel state information quantization error satisfy a particular level or higher, the number of bits for the codebook should increase in proportion to the number of transmission antennas. For example, when $N \to \infty$ and $B_{tot} \to \infty$, it is well known that loss in the normalized beamforming gain is given as Equation (2) below based on a Random Vector Quantization (RVQ) codebook, which is an optimal VQ $$\frac{B_{tot}}{N} = B$$

codebook having a fixed ratio.

$$E[\tilde{h}^H c_{opt}] = 1 - 2^{-\frac{B_{tot}}{N-1}} \quad \text{Equation (2)}$$

In Equation (2), $B_{tot}$ denote the number of feedback overhead bits, N denotes the number of transmission antennas, and $$\tilde{h} = \frac{h}{\|h\|}$$

denotes a normalized channel vector.

Based on Equation (2) above, the feedback overhead $B_{tot}$ has to increase in proportion to N in order to maintain the normalized beamforming at a certain level. For example, in order to achieve 50% accuracy, the feedback overhead $B_{tot}$ should be $B_{tot}=N-1$. Specifically, when N is 64, $B_{tot}$ should be 63 bits. That is, when the number of antennas is 64, the feedback overhead should be 63 bits. The above excessive overhead cannot be accepted by a wireless communication system using limited radio resources.

As a method of reducing the feedback overhead, a channel structure or an antenna structure may be appropriately used. For example, in the FD-MIMO system using a Uniform Planar Array (UPA) antenna structure, Kronecker-Product (KP) codebooks may be used for channel quantization in order to reduce the feedback overhead. The present disclosure provides a method of improving the conventional Kronecker-Product codebooks. Further, the present disclosure proposes a channel state information quantization method for feedback of high-accuracy channel state information while maintaining overhead bits equal to or lower than a predetermined level through the improved Kronecker-Product codebooks.

Figure 3:
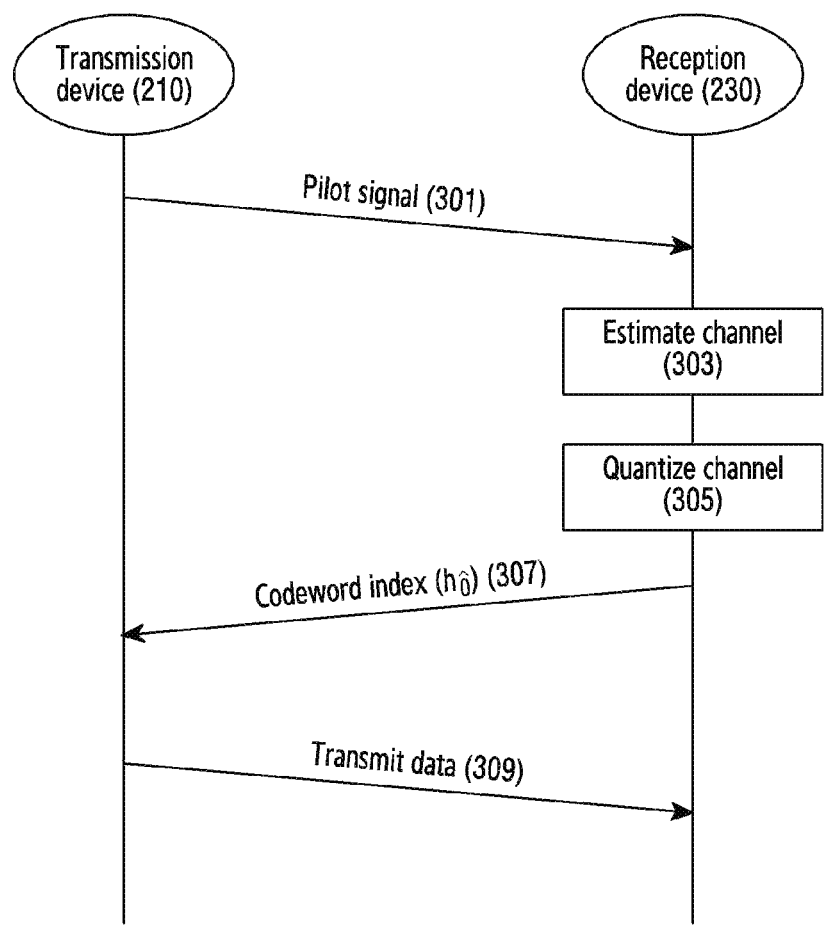
FIG. 3 illustrates channel quantization and a feedback operation of the quantization result between the transmission device and the reception device in the multiple-input multiple-output system according to the present disclosure.

FIG. 3 illustrates channel quantization and a feedback operation of the quantization result between a transmission device and a reception device in a multiple-input multiple-output system according to the present disclosure. Referring to FIG. 3, in step 301, the transmission device 210 may transmit a pilot signal and the reception device 230 may receive the pilot signal transmitted from the transmission device 210. The reception device 230 may estimate a reception channel based on the received pilot signal in step 303. The reception device 230 may quantize the received reception channel based on improved Kronecker-Product codebooks in step 305. The reception device 230 may feed back a selected optimal codeword index based on a result of the quantization to the transmission device 210 in step 307. The transmission device 210 may re-configure a channel vector based on information fed back from the reception device 230 and transmit data based on the re-configured channel vector in step 309. Hereinafter, a method of quantizing the received channel using the improved Kronecker-Product codebooks will be described in detail.

Prior to proposing the improved Kronecker-Product codebooks according to the present disclosure, the normal Kronecker-Product codebooks will be first described. However, this is only for easier understanding of the improved Kronecker-Product codebooks proposed by the present invention, and thus should not be construed as limiting embodiments.

As described above, in the FD-MIMO system using the UPA antenna structure, the Kronecker-Product codebooks may be used for quantization of channel state information. For example, the transmission device 210 using the UPA antenna structure of $N_v$ by $N_h$ ($N_v$ rows and $N_h$ columns) is assumed. Further, for the purpose of convenience of the description, and without limiting the embodiments, the reception device 210 using one antenna is assumed. In this case, the overall channel vector may be represented as Equation (3) below.

$$h=[h_1, \ldots ,h_{N_vN_h}]^T \quad \text{Equation (3)}$$

In Equation (3) above, $h_i$ denotes a channel corresponding to each antenna, and $N_v$ and $N_h$ denote the number of rows and the number of columns in the UPA antenna structure, respectively. The channel vector may be converted into a matrix form, as shown in Equation (4).

$$\overline{H} = \begin{bmatrix} h^T_{[1:N_h]} \\ h^T_{[N_h+1:2N_h]} \\ \vdots \\ h^T_{[N_U(N_h-1)+1:N_UN_h]} \end{bmatrix} \quad \text{Equation (4)}$$

In Equation (4) above, by performing singular value decomposition on $\overline{H}$, Equation (5) below can be acquired.

$$U\Sigma V^H = \overline{H} \quad \text{Equation (5)}$$

In Equation (5) above, U denotes an orthogonal matrix of M by M, Σ denotes a diagonal matrix of M by N in which elements on a diagonal line have integer values rather than negative values and the remaining elements are 0, and $V^H$ denotes a unitary matrix of N by N, which is a conjugate transpose matrix of V. U includes dominant direction information of a vertical domain of all channels and V includes dominant direction information of a horizontal domain of all channels.

By analyzing Equation (5) in more detail, Equation (6) below can be acquired.

$$\begin{aligned} h &= vec(\overline{H}^T) \\ &= vec\left(V * \sum U^T\right) \\ &= vec\left(\sum_k \sigma_k v_k^* u_k^T\right) \\ &= vec\left(\sum_k \sigma_k [v_k^* u_k(1) \ v_k^* u_k(2) \ \ldots \ v_k^* u_k(N_v)]\right) \\ &= \sum_k \sigma_k u_k \otimes v_k^* \end{aligned} \quad \text{Equation (6)}$$

In Equation (6), $u_k$ and $v_k$ denote $k^{th}$ columns of U and V, respectively, $\sigma_k$ denotes a $k^{th}$ singular value of $\overline{H}$, and $u_k(n)$ denotes an $n^{th}$ element of $u_k$. Referring to Equation (6) above, it is noted that Kronecker products of $u_k$ and $v_k$ can represent h.

That is, h may be represented by Kronecker products of $u_k$ including vertical domain information of all channels and $v_k$ including horizontal domain information. The reception device 230 can implement a higher accuracy channel and feed back channel state information through quantization of multiple $u_k$ and $v_k$. However, as the number of quantization targets of $u_k$ and $v_k$ increases, the feedback overhead increases and computational complexity performed by the reception device 230 increases. The analysis of an empirical cumulative distribution function of $\sigma_1^2/\|h\|^2$ experimentally shows that about 70% of channel gain is contained in the dominant direction of all channels. That is, it is possible to implement a channel having a predetermined level of accuracy or higher through quantization of $u_1$ and $v_1$ only.

Accordingly, the following embodiments propose a method of quantizing $u_1$ and $v_1$. More specifically, the following embodiments propose an efficient method of quantizing $u_1$ and $v_1$ by improving the conventional Kronecker-Product codebook.

Figure 4A:
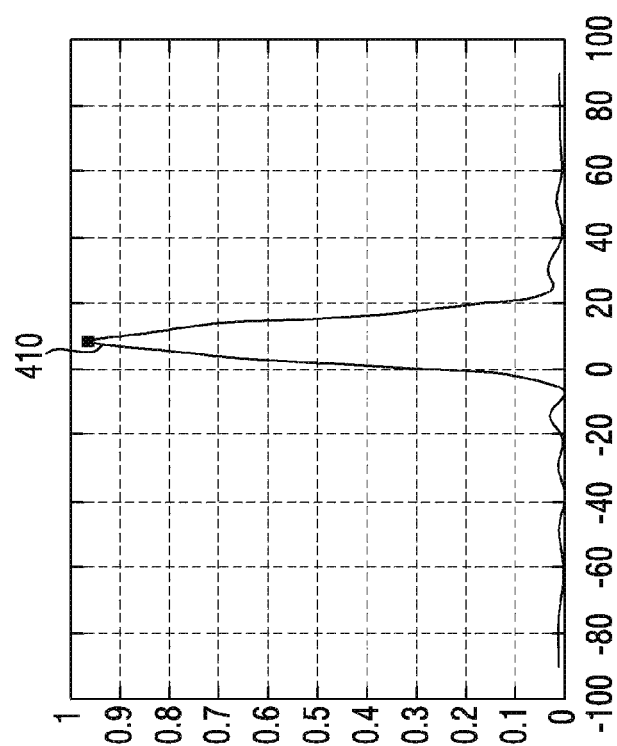
FIG. 4 illustrates an example of beam patterns of $u_1$ and $v_1$.
Figure 4B:
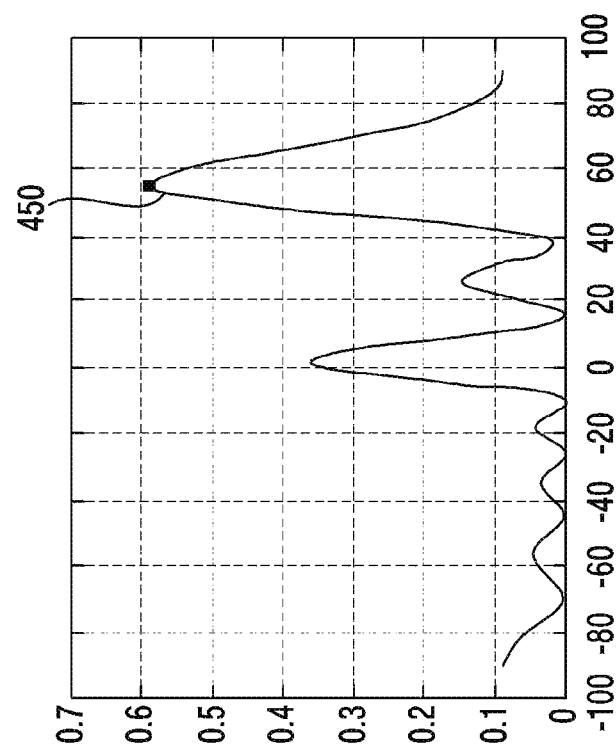

For the quantization of $u_1$ and $v_1$, the reception device 230 is required to analyze the beam patterns of $u_1$ and $v_1$. FIG. 4 illustrates an example of the beam patterns of $u_1$ and $v_1$. In FIG. 4A, a horizontal axis indicates direction information of a vertical domain of the channel, and a vertical axis indicates a channel gain. In FIG. 4B, a horizontal axis indicates direction information of a horizontal domain, and a vertical axis indicates a channel gain. Referring to FIG. 4A, $u_1$ has one dominant beam pattern. However, referring to FIG. 4B, $v_1$ has two or more dominant beam patterns. When $u_1$ has one dominant beam pattern, as illustrated in FIG. 4A, the reception device 230 can quantize channel state information sufficiently well to have acceptable quantization accuracy based on a single Discrete Fourier Transform (DFT) codebook. However, when $v_1$ has two or more dominant beam patterns, as illustrated in FIG. 4B, the reception device 230 has difficulty in acquiring acceptable quantization accuracy through the use of the single Discrete Fourier Transform (DFT) codebook. That is, when $v_1$ having a plurality of dominant beam patterns is quantized using the single DFT codebook, the performance may deteriorate. Accordingly, when at least one of $u_1$ and $v_1$ has a plurality of dominant beam patterns, the present disclosure proposes a method of efficiently quantizing $u_1$ and $v_1$.

First Embodiment: A Method Using a Plurality of Codewords

First, a situation in which at least one of $u_1$ and $v_1$ has two or more dominant beam patterns may be assumed. For convenience of description, the following embodiment proposes an improved quantization method of a dominant direction of a vertical domain $u_1$. However, the embodiment may be also applied to quantization of a horizontal domain $v_1$ as well as the vertical domain $u_1$ in the same way.

The first embodiment corresponds to a quantization method using three codebooks. In the first embodiment, the reception device 230 quantizes $u_1$ using three codebooks $C_v$, $C_{v,1}$, and $C_{v,2}$ (here, it is obvious to use three different codebooks for quantization of $v_1$). However, when $u_1$ includes a plurality of dominant beam patterns greater than two in number, the reception device 230 may quantize $u_1$ using more than three codebooks. For convenience of description, the case where $u_1$ has two dominant beam patterns will be assumed and described. According to an embodiment, $C_v$, $C_{v,1}$, and $C_{v,2}$ may have a relationship therebetween such that when $C_{v,1}$ is $B_{v,1}$ bits and $C_{v,2}$ is $B_{v,2}$ bits, $C_v$ corresponds $B_{v,1}+B_{v,2}$ bits.

The first embodiment may include four steps below.

The first step corresponds to a quantization step of $u_1$ using a codebook $C_v$. The reception device 210 may quantize $u_1$ through Equation (7) below.

$$\hat{c}_v = \underset{c \in C_U}{\mathrm{argmax}} \|u_1^H c\|^2 \quad \text{Equation (7)}$$

In Equation (7), $C_v$ denotes a codebook, c denotes a codeword included in $C_v$, $u_1$ denotes an M-by-M matrix acquired through singular value decomposition of h, and $\hat{c}_v$ denotes a codeword selected based on the result of quantization of $u_1$. $u_1$ also includes information on a vertical domain of h.

The second step corresponds to a quantization step of $u_1$ using a codebook $C_{v,1}$. The reception device 210 may quantize $u_1$ through Equation (8) below.

$$\hat{c}_{v,1} = \underset{c \in C_{v,1}}{\operatorname{argmax}} \|u_1^H c\|^2 \quad \text{Equation (8)}$$

In Equation (8), $C_{v,1}$ denotes a codebook, c denotes a codeword included in $C_{v,1}$, $u_1$ denotes an M-by-M matrix acquired through singular value decomposition of h, and $\hat{c}_{v,1}$ denotes a codeword selected based on the result of quantization of $u_1$ by $C_{v,1}$.

The third step is a quantization step of $u_1$ using $C_{v,2}$ based on the quantization result of the second step. The reception device 210 may quantize $u_1$ through Equation (9) below.

$$\hat{c}_{v,2} = \underset{c \in C_{v,2}}{\operatorname{argmax}} \left\| u_1^H \frac{\hat{c}_{v,1} + c}{\|\hat{c}_{v,1} + c\|} \right\|^2 \quad \text{Equation (9)}$$

In Equation (9), $C_{v,2}$ denotes a codebook, c denotes a codeword included in $C_{v,2}$, $u_1$ denotes an M-by-M matrix acquired through singular value decomposition of h, and $\hat{c}_{v,2}$ denotes a codeword selected based on the result of quantization of $u_1$.

That is, the third step of the first embodiment corresponds to a process of finding the second codeword $\hat{c}_{v,2}$ using the first codeword $\hat{c}_{v,1}$, selected based on the result of quantization of $u_1$ by the reception device 230 in the second step. That is, when $u_1$ includes two dominant beam patterns, the reception device 230 determines the codeword $\hat{c}_{v,1}$ corresponding to the first dominant beam pattern through the quantization of the second step. Further, based on the determined $\hat{c}_{v,1}$, the reception device 230 determines $\hat{c}_{v,2}$, which makes the best combination with $\hat{c}_{v,1}$ based on Equation (9) in the third step. As a result, in the third step, the reception device 230 quantizes U using the two codebooks $C_{v,1}$ and $C_{v,2}$.

The fourth step corresponds to a step of selecting a final method of quantizing $u_1$ through comparison between the quantization result of the first step and the quantization results of the second and third steps. Specifically, the reception device 230 may determine the final method of quantizing $u_1$ through Equation (10) below.

$$\text{if } \|u_1^H \hat{c}_v\|^2 \geq \left\| u_1^H \frac{\hat{c}_{v,1} + \hat{c}_{v,2}}{\|\hat{c}_{v,1} + \hat{c}_{v,2}\|} \right\|^2 \quad \text{Equation (10)}$$

$$\text{then } c_v = \hat{c}_v$$

$$\text{else } c_v = \frac{\hat{c}_{v,1} + \hat{c}_{v,2}}{\|\hat{c}_{v,1} + \hat{c}_{v,2}\|}$$

In Equation (10), $u_1$ denotes an M-by-M matrix acquired through singular value decomposition of h, $\hat{c}_v$ denotes a codeword selected based on a result of quantization of $u_1$ using the codebook $C_v$, $\hat{c}_{v,1}$ denotes a codeword selected based on a result of quantization of $u_1$ using the first codebook $C_{v,1}$, $\hat{c}_{v,2}$ denotes a codeword selected based on a result of quantization of $u_1$ using the second codebook $C_{v,2}$, and $c_v$ denotes the finally selected codeword.

Equation (10) above corresponds to a process of selecting a codeword having higher quantization accuracy through comparison between the quantization result using the codebook $C_v$ and the quantization result through the combination of the second codebook $C_{v,1}$ and the third codebook $C_{v,2}$. When $$\|u_1^H \hat{c}_v\|^2 \geq \left\| u_1^H \frac{\hat{c}_{v,1} + \hat{c}_{v,2}}{\|\hat{c}_{v,1} + \hat{c}_{v,2}\|} \right\|^2$$

is satisfied in Equation (10) above, the final quantization result of $u_1$ is $c_v = \hat{c}_v$. That is, the reception device 230 selects the codeword $\hat{c}_v$ included in the codebook $C_v$. However, when $$\|u_1^H \hat{c}_v\|^2 \geq \left\| u_1^H \frac{\hat{c}_{v,1} + \hat{c}_{v,2}}{\|\hat{c}_{v,1} + \hat{c}_{v,2}\|} \right\|^2$$

is not satisfied in Equation (10), the final quantization result of $u_1$ is $$c_v = \frac{\hat{c}_{v,1} + \hat{c}_{v,2}}{\|\hat{c}_{v,1} + \hat{c}_{v,2}\|}.$$

That is, the reception device 230 selects $\hat{c}_{v,1}$ included in the codebook $C_{v,1}$ and $\hat{c}_{v,2}$ included in the codebook $C_{v,2}$ and determines the final codeword to be $$\frac{\hat{c}_{v,1} + \hat{c}_{v,2}}{\|\hat{c}_{v,1} + \hat{c}_{v,2}\|}.$$

The first embodiment can be conceptually summarized as follows. First, the reception device 230 quantizes $u_1$ using the codebook $C_v$. Next, the reception device 230 acquires $\hat{c}_{v,1}$ by quantizing $u_1$ through the use of the codebook $C_{v,1}$ and acquires $\hat{c}_{v,2}$ by quantizing $u_1$ through the use of the codebook $C_{v,2}$ based on a result thereof. In order to acquire $\hat{c}_{v,2}$, the reception device 230 may use Equation (9). The reception device 230 determines one of the final codewords $\hat{c}_v$ and $$\frac{\hat{c}_{v,1} + \hat{c}_{v,2}}{\|\hat{c}_{v,1} + \hat{c}_{v,2}\|}$$

through comparison between $\|u_1^H \hat{c}_v\|^2$ and $$\left\| u_1^H \frac{\hat{c}_{v,1} + \hat{c}_{v,2}}{\|\hat{c}_{v,1} + \hat{c}_{v,2}\|} \right\|^2.$$

According to an embodiment, when $u_1$ has one dominant beam pattern, the reception device 230 may select $\hat{c}_v$ as the final codeword. According to another embodiment, when $u_1$ has two or more dominant beam patterns, the reception device 230 may $$\frac{\hat{c}_{v,1} + \hat{c}_{v,2}}{\|\hat{c}_{v,1} + \hat{c}_{v,2}\|}$$

as the final codeword.

According to the first embodiment, channel state information feedback overhead transmitted from the reception device 230 to the transmission device 210 may be determined as follows. According to an embodiment, the codebook $C_{v,1}$ and the codebook $C_{v,2}$ have a relationship such that they are included in the codebook $C_v$. When the codebook $C_{v,1}$ is $B_{v,1}$ bits and the codebook $C_{v,2}$ is $B_{v,2}$ bits, the codebook $C_v$ may be $B_{v,1}+B_{v,2}$ bits. In this case, the channel state information feedback overhead may be determined through Equation (11) below.

$$B_{v,1}+B_{v,2}+1 \qquad \text{Equation (11)}$$

Equation (11) indicates the total feedback overhead. In Equation (11), one added bit is used to indicate information on the selection in the fourth step. As a result, the feedback information overhead according to the first embodiment may increase in comparison with the case using one DFT codebook, but when $u_1$ includes a plurality of dominant beam patterns, the accuracy of the feedback information can be sufficiently guaranteed to be reliable.

It is obvious that the first embodiment including the method of quantizing $u_1$ can be equally applied to $V_1$ as described above.

Figure 5:
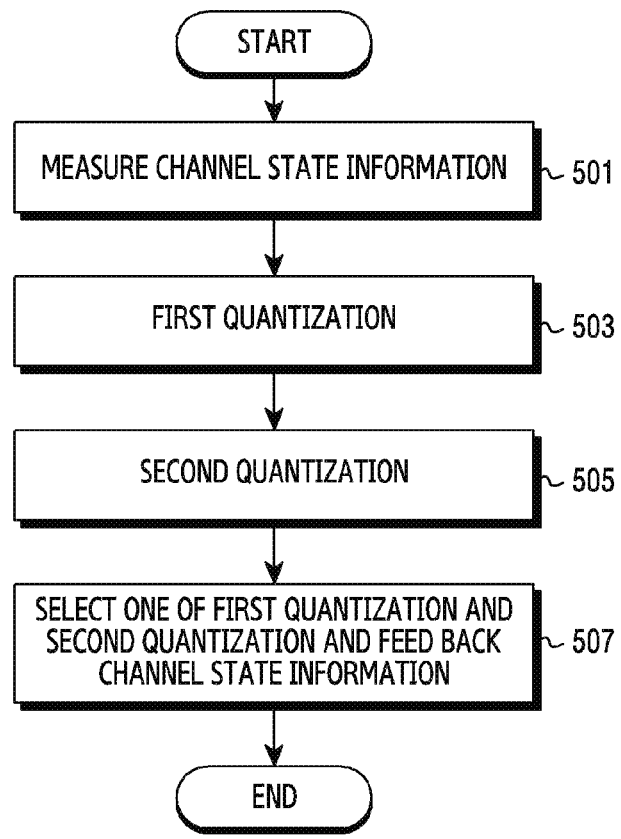
FIG. 5 is a flowchart illustrating the operation of the reception device for feedback of channel state information in the wireless communication system according to the present disclosure.

FIG. 5 is a flowchart illustrating the operation of the reception device 230 for feedback of channel state information in the wireless communication system according to the present disclosure. Each step of FIG. 5 may be performed by the reception device 230 of FIG. 2.

Referring to FIG. 5, the reception device 230 may measure channel state information in step 501. Specifically, the reception device 230 may receive a signal (for example, a reference signal or a pilot signal) from the transmission device 210 and estimate a channel through which the signal is transmitted. According to an embodiment, the case where the transmission device 210 transmits a signal through UPA antennas of Nv by Nh (Nv rows and Nh columns) and the reception device 230 receives the signal through one antenna may be assumed. In this case, the reception device may acquire the total channel vector $h=[h_1, \ldots, h_{N_vN_h}]^T$ through the channel estimation. In the total channel vector, $h_i$ denotes a channel corresponding to each antenna, and Nv and Nh denote the number of rows and the number of columns in the UPA antenna structure, respectively. The total channel vector may be converted into the form of a total channel matrix as shown in Equation (4) above.

Although not illustrated in FIG. 5, the reception device 230 may perform singular value decomposition on the total channel matrix based on Equation (5) above. As a result of the singular value decomposition of the total channel matrix, the reception device 230 may acquire $u_1$ including information on a horizontal domain of all channels and $V_1$ including information on a vertical domain of all channels.

The reception device 230 may quantize $u_1$. Specifically, the reception device 230 may perform first quantization on $u_1$ using a Kronecker-product codebook $C_v$ suitable for UPA antennas in step 503. According to an embodiment, the reception device 230 may perform the first quantization on $u_1$ based on Equation (7). Further, the reception device 230 may quantize $V_1$ in the same way as $u_1$. However, a Kronecker-product codebook $C_v$ used for the quantization of $V_1$ may be different from $C_v$ used for the quantization of $u_1$.

The reception device 230 may perform second quantization on $u_1$ using Kronecker-product codebooks $C_{v,1}$ and $C_{v,2}$ in step 505. Specifically, the second quantization step may be divided into two sub-steps. First, the reception device 230 quantizes $u_1$ using the Kronecker-product codebook $C_{v,1}$. A method of quantizing $u_1$ using the Kronecker-product codebook $C_{v,1}$ may be performed through Equation (8) above. Further, the reception device 230 quantizes $u_1$ using the Kronecker-product codebook $C_{v,2}$ based on a result of the quantization using the Kronecker-product codebook $C_{v,1}$. A method of quantizing $u_1$ using the Kronecker-product codebook $C_{v,2}$ may be performed through Equation (9) above. A detailed method of the second quantization is the same as the second and third steps of the four steps in the first embodiment described above. The second quantization step is also performed on $v_1$ as well as $u_1$, like the first quantization step. In the second quantization step, the method of quantizing $v_1$ is the same as the method of quantizing $u_1$. However, a Kronecker-product codebook $v_1$ used for the quantization of $v_1$ may be different from the Kronecker-product codebooks $C_{v,1}$ and $C_{v,2}$ used for the quantization of $u_1$.

When the first quantization and the second quantization on $u_1$ have been completed, the reception device 230 may select one of a first quantization result and a second quantization result and feed back channel state information according to the selected result in step 507. Specifically, the reception device 230 may compare the first quantization result and the second quantization result based on Equation (10) above and select one of them. Further, the reception device 230 may transmit feedback information including the selected result to the transmission device 210. In the same way as was performed with respect to $u_1$, the reception device 230 selects one of a first quantization result and a second quantization result with respect to $v_1$ and provides feedback. For channel state information feedback, the transmission device 210 may allocate a Physical Uplink Control Channel (PUCCH) or a Physical Uplink Shared Channel (PUSCH) to the reception device 230. The reception device 230 may feed back channel state information using the allocated PUCCH or PUSCH.

A method of transmitting feedback by a reception device according to an embodiment of the present disclosure includes a process of measuring channel state information, a first quantization process of quantizing the channel information using a first codebook, a second quantization process of quantizing the channel information using second and third codebooks different from the first codebook, and a process of feeding back the channel state information based on a result of selection of one of the first quantization process and the second quantization process.

A method of transmitting feedback by a reception device according to another embodiment of the present disclosure further includes a process of decomposing channel state information into a first component $u_1$ and a second component $v_1$ based on the Kronecker product, wherein the first component $u_1$ is a matrix including information on a vertical domain of a total channel vector h and the second component $v_1$ is a matrix including information on a horizontal domain of the total channel vector h.

The first quantization process and the second quantization process according to another embodiment of the present disclosure include a process of quantizing each of the first component $u_1$ and the second component $v_1$.

The selection of one of the first quantization process and the second quantization process according to another embodiment of the present disclosure is performed with respect to each of $u_1$ and $v_1$ and determined based on dominant beam patterns of $u_1$ and $v_1$.

The first quantization process according to another embodiment of the present disclosure is determined using Equation (12) below.

$$\hat{c}_h = \underset{c \in C_h}{\mathrm{argmax}} \|v_1^H c\|^2$$

$$\hat{c}_v = \underset{c \in C_v}{\mathrm{argmax}} \|u_1^H c\|^2$$

Equation (12)

In Equation (12) above, $C_h$ denotes a codebook for quantization of $v_1$, $C_v$ denotes a codebook for quantization of $u_1$, c denotes a codeword, $\hat{c}_h$ denotes a codeword selected based on a result of the quantization of $V_1$, $\hat{c}_v$ denotes a codeword selected based on a result of the quantization of $u_1$, and $C_h$ and $C_v$ are included in the first codebook.

The second quantization process according to another embodiment of the present disclosure includes a process of quantizing the channel state information using a second codebook and a process of quantizing the channel state information using a third codebook based on a result of quantization using the second codebook.

The process of quantizing the channel state information using the second codebook according to another embodiment of the present disclosure is determined based on Equation (13) below.

$$\hat{c}_{h,1} = \underset{c \in C_{h,1}}{\mathrm{argmax}} \|v_1^H c\|^2$$

$$\hat{c}_{v,1} = \underset{c \in C_{v,1}}{\mathrm{argmax}} \|u_1^H c\|^2$$

Equation (13)

In Equation (13) above, $C_{h,1}$ denotes a codebook for quantization of $v_1$, $C_{v,1}$ denotes a codebook for quantization of $u_1$, c denotes a codeword, $\hat{c}_{h,1}$ denotes a codeword selected based on a result of the quantization of $v_1$, $\hat{c}_{v,1}$ denotes a codeword selected based on a result of the quantization of $u_1$, and $C_{h,1}$ and $C_{v,1}$ are included in the second codebook.

A process of quantizing the channel state information using a third codebook based on the result of quantization using the second codebook according to another embodiment of the present disclosure is determined based on Equation (14) below.

$$\hat{c}_{h,2} = \underset{c \in C_{h,2}}{\mathrm{argmax}} \left\| u_1^H \frac{\hat{c}_{h,1} + c}{\|\hat{c}_{h,1} + c\|} \right\|^2$$

$$\hat{c}_{v,2} = \underset{c \in C_{v,2}}{\mathrm{argmax}} \left\| u_1^H \frac{\hat{c}_{v,1} + c}{\|\hat{c}_{v,1} + c\|} \right\|^2$$

Equation (14)

In Equation (14) above, $\hat{c}_{h,1}$ and $\hat{c}_{v,1}$ denote codewords selected based on the quantization results using the second codebook, $C_{h,2}$ denotes a codebook for quantization of $v_1$, $C_{v,2}$ denotes a codebook for quantization of $u_1$, c denotes a codeword, $\hat{c}_{h,2}$ denotes a codeword selected base+d on the result of quantization of $v_1$, $\hat{c}_{v,2}$ denotes a codeword selected based on the result of quantization of $u_1$, and $C_{h,2}$ and $C_{v,2}$ are included in the third codebook.

Figure 6:
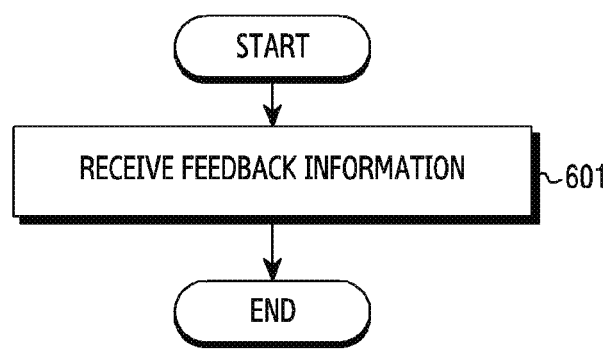
FIG. 6 is a flowchart illustrating the operation of the transmission device for receiving feedback of channel state information in the wireless communication system according to the present disclosure.

FIG. 6 is a flowchart illustrating the operation of the transmission device 210 for receiving channel state information feedback in the wireless communication system according to the present disclosure. The transmission device 210 should receive channel state information from the reception device 230 in order to determine terminals to which the transmission device 210 transmits signals in connection with downlink transmission, a data transmission rate at which the transmission device 210 performs transmission, and precoding to be applied.

Referring to FIG. 6, the transmission 210 may receive channel state information feedback from the reception device 230 in step 601. The channel state information may be quantized to reduce the feedback overhead. According to an embodiment, the reception device 230 may quantize the channel state information using Kronecker-product codebooks, and a detailed method thereof has been described above. Although not illustrated in FIG. 6, in order to receive the channel state information feedback, the transmission device 210 may allocate a Physical Uplink Control Channel (PUCCH) or a Physical Uplink Shared Channel (PUSCH) to the reception device 230.

A method of receiving feedback by a transmission device in a multiple-input multiple-output system according to an embodiment of the present disclosure includes a process of receiving feedback of channel state information, and the feedback information is determined through a process of performing first quantization on the channel state information using a first codebook, performing second quantization on the channel state information using second and third codebooks, which are different from the first codebook, and selecting one of the first quantization and the second quantization through comparison between the first quantization and the second quantization.

The second quantization according to another embodiment of the present disclosure includes quantization using the second codebook and quantization using the third codebook based on a quantization result using the second codebook.

Second Embodiment: A Method of Designing a New Codeword

As described above, the feedback overhead is $B_{v,1}+B_{v,2}+1$ bits in the first embodiment. The second embodiment presents feedback overhead smaller than that of the first embodiment in the quantization method for the case where at least one of $u_1$ and $v_1$ has a plurality of dominant beam patterns. That is, the second embodiment proposes the design of a new codeword c, unlike the first embodiment, which presents the quantization method through the combination of existing codewords.

The new codeword c may be determined through Equation (15) below.

$$c = \frac{c_i + c_j}{\|c_i + c_j\|}$$

Equation (15)

In Equation (15), $c_i$ and $c_j$ denote DFT codewords included in the same codebook.

According to an embodiment, a 6-bit codebook $C_{6bit}$ designed using Equation (15) is described below. The codebook $C_{6bit}$ includes a total of 64 DFT codewords. The codebook $C_{6bit}$ basically includes 32 DFT codewords included in a 5-bit codebook. Accordingly, the remaining 32

DFT codewords included in the codebook $C_{6bit}$ may be determined through Equation (15) above.

Table 1 below shows an example of DFT pairing for generating new codewords for a vertical domain.

TABLE 1

| Codeword index | 33 | 34 | 35 | 36 | 37 | 38 | 39 | 40 |
|---|---|---|---|---|---|---|---|---|
| Pairing | (1, 2) | (1, 4) | (1, 32) | (2, 3) | (2, 5) | (3, 4) | (3, 6) | (3, 32) |
| Codeword index | 41 | 42 | 43 | 44 | 45 | 46 | 47 | 48 |
| Pairing | (4, 5) | (5, 6) | (6, 7) | (7, 8) | (8, 9) | (26, 27) | (27, 28) | (27, 30) |
| Codeword index | 49 | 50 | 51 | 52 | 53 | 54 | 55 | 56 |
| Pairing | (27, 31) | (28, 29) | (28, 30) | (28, 31) | (28, 32) | (26, 29) | (27, 29) | (29, 30) |
| Codeword index | 57 | 58 | 59 | 60 | 61 | 62 | 63 | 64 |
| Pairing | (29, 31) | (29, 32) | (1, 30) | (30, 31) | (30, 32) | (2, 31) | (26, 31) | (31, 32) |

In Table 1 above, codeword indexes start from 33 and end at 64 since codeword indexes 1 to 32 are assigned to codewords included in the 5-bit codebook. Referring to Table 1 above, for example, a DFT codeword of index 33 is generated through a combination of DFT codewords 1 and 2. In another example, a DFT codeword of index 59 is generated through a combination of DFT codewords 1 and 30. The combination of two DFT codewords may be performed through Equation (15) above.

Table 2 below shows an example of DFT pairing for generating new codewords for a horizontal domain.

TABLE 2

| Codeword index | 33 | 34 | 35 | 36 | 37 | 38 | 39 | 40 |
|---|---|---|---|---|---|---|---|---|
| Pairing | (1, 2) | (1, 3) | (1, 4) | (1, 18) | (1, 30) | (1, 31) | (1, 32) | (2, 3) |
| Codeword index | 41 | 42 | 43 | 44 | 45 | 46 | 47 | 48 |
| Pairing | (2, 4) | (2, 16) | (2, 17) | (2, 31) | (2, 32) | (3, 32) | (6, 7) | (7, 10) |
| Codeword index | 49 | 50 | 51 | 52 | 53 | 54 | 55 | 56 |
| Pairing | (11, 12) | (11, 14) | (14, 15) | (15, 16) | (13, 16) | (17, 18) | (18, 19) | (18, 20) |
| Codeword index | 57 | 58 | 59 | 60 | 61 | 62 | 63 | 64 |
| Pairing | (18, 21) | (18, 23) | (19, 20) | (22, 23) | (28, 29) | (31, 32) | (17, 32) | (30, 32) |

In Table 2 above, codeword indexes start from 33 and end at 64 since codeword indexes 1 to 32 are assigned to codewords included in the 5-bit codebook like in Table 1. Referring to Table 2 above, for example, a DFT codeword of index 35 is generated through a combination of DFT codewords 1 and 4. In another example, a DFT codeword of index 55 is generated through a combination of DFT codewords 18 and 19. The combination of two DFT codewords may be performed through Equation (12) above.

Figure 7:
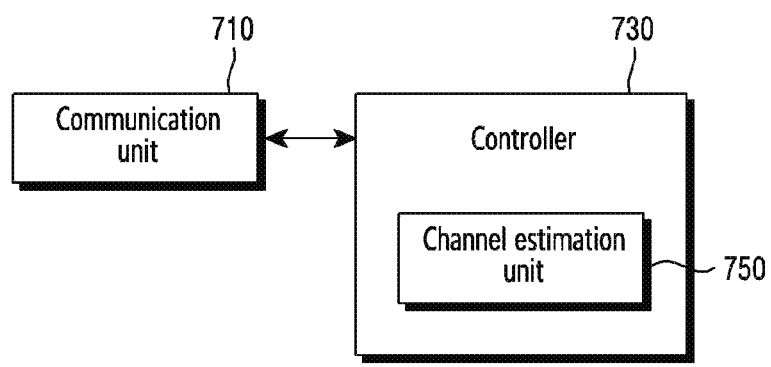
FIG. 7 is a block diagram illustrating the internal structure of the reception device according to the present disclosure.
Figure 8:
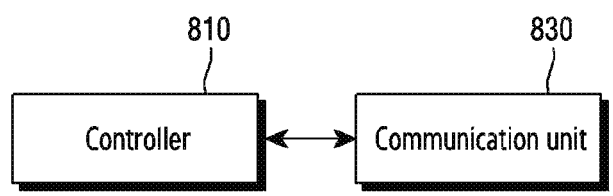
FIG. 8 is a block diagram illustrating the internal structure of the transmission device according to the present disclosure.

FIGS. 7 and 8 illustrate a transmission device and a reception device for implementing the first embodiment and the second embodiment.

FIG. 7 is a block diagram illustrating the internal structure of the reception device 230 according to the present disclosure. The reception device 230 may be a terminal device according to an embodiment. Referring to FIG. 7, the reception device 230 may include a communication unit 710 and a controller 730. The communication unit 710 may perform a function of transmitting or receiving data to/from the outside (for example, a BS). The communication unit 710 may transmit feedback information for FD-MIMO technology to the BS under the control of the controller 730.

The controller 730 controls the states and operations of all elements included in the reception device 230. Specifically, the controller 730 generates feedback information for FD-MIMO according to information received from the transmission device 210. Further, the controller 730 controls the communication unit 710 to feed back generated channel information to the BS according to timing information received from the BS. To this end, the controller 730 may include a channel estimation unit 750. The channel estimation unit 750 may determine required feedback information through a signal (for example, a reference signal) received from the BS and feedback allocation information and estimate a channel using the received signal.

Although FIG. 7 illustrates an example in which the reception device 230 includes the communication unit 710 and the controller 730, the reception device 230 is not limited thereto, and may further include various elements depending on the function performed by the reception device 230. For example, the reception device 230 may include a display unit for displaying the current state of the reception device 230, an input unit for receiving a signal for performing a function from a user, and a storage unit for storing generated data in the reception device 230. Further, FIG. 7 illustrates the controller 730 and the channel estimation unit 750 as separate blocks, but the invention is not necessary limited thereto. For example, the function performed by the channel estimation unit 750 may be performed by the controller 730.

FIG. 8 is a block diagram illustrating the internal structure of the transmission device 210 according to the present disclosure. The reception device 230 may be the transmission device 210 according to an embodiment. Referring to FIG. 3, the transmission device 210 may include a controller 810 and a communication unit 830. The controller 810 controls the states and operations of all elements included in the transmission device 210. Specifically, the controller 810 allocates resources for horizontal and vertical component channel estimation of the reception device 230 to the terminal and allocates feedback resources and feedback timing to the terminal. To this end, the controller 810 may further include a resource allocation unit, although this is not illustrated in FIG. 8.

The resource allocation unit allocates vertical and horizontal component channels to resources to allow the reception device 230 to estimate each of the vertical and horizontal component channels and transmits a signal using the corresponding resources. Further, the resource allocation unit allocates feedback settings and feedback timing to avoid the collision of feedback from a plurality of reception devices, and receives and analyzes feedback information provided at the corresponding timing.

The communication unit 830 performs a function of transmitting and receiving data, signals, and feedback information to the reception device 210. The communication unit 830 transmits a signal (for example, a reference signal) to the reception device 230 through the allocated resources and receives feedback on channel information from the reception device 230 under the control of the controller 810.

Although FIG. 8 illustrates the controller 810 and the resource allocation unit as separate blocks, the present invention is not necessarily limited thereto. For example, the function performed by the resource allocation unit may be performed by the controller 810.

The embodiments of the present invention disclosed herein and shown in the drawings are merely specific examples presented in order to easily describe technical details of the present invention and to help the understanding of the present invention, and are not intended to limit the scope of the present invention. Further, the embodiments of the present invention as described above are merely illustrative, and it will be understood by those skilled in the art that various modifications and equivalents thereof are possible within the scope of the present invention. Therefore, the true technical scope of protection of the present invention should be defined by the following appended claims.

Methods stated in claims and/or specifications according to various embodiments may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present invention as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

The invention claimed is:

1. A method for operating a reception device in a wireless communication system, the method comprising:
   determining channel state information;
   performing first quantization of quantizing the channel state information using a first codebook;
   performing second quantization of quantizing the channel state information using a second codebook and a third codebook which are different from the first codebook;
   selecting one of the first quantization and the second quantization based on a number of dominant beam patterns; and
   transmitting the channel state information based on the selection of the one of the first quantization and the second quantization.

2. The method of claim 1, further comprising decomposing the channel state information into a first component $u_1$ and a second component $v_1$ based on a Kronecker product,
   wherein the first component $u_1$ is a matrix including information on a vertical domain of a total channel vector h and the second component $v_1$ is a matrix including information on a horizontal domain of the total channel vector h.

3. The method of claim 2, wherein the performing of the first quantization and the second quantization comprises quantizing each of the first component $u_1$ and the second component $v_1$.

4. The method of claim 2, wherein the selection of one of the first quantization and the second quantization is performed with respect to each of $u_1$ and $v_1$, and is determined based on the dominant beam patterns of $u_1$ and $v_1$.

5. The method of claim 2, wherein the first quantization uses an equation of $$\hat{c}_h = \underset{c \in C_h}{\mathrm{argmax}} \|v_1^H c\|^2$$

$$\hat{c}_v = \underset{c \in C_v}{\mathrm{argmax}} \|u_1^H c\|^2,$$

where $C_h$ denotes a codebook for quantization of $v_1$, $C_v$ denotes a codebook for quantization of $u_1$, c denotes a codeword, $\hat{c}_h$ denotes a codeword selected based on a result of the quantization of $v_1$, and $\hat{c}_v$ denotes a codeword selected based on a result of the quantization of $u_1$, $C_h$ and $C_v$ being included in the first codebook.

6. The method of claim 2, wherein the performing of the second quantization comprises:
   quantizing the channel state information using the second codebook; and
   quantizing the channel state information using the third codebook based on a result of the quantization using the second codebook.

7. The method of claim 6, wherein the quantizing of the channel state information using the second codebook uses an equation of $$\hat{c}_{h,1} = \underset{c \in C_{h,1}}{\operatorname{argmax}} \|v_1^H c\|^2$$

$$\hat{c}_{v,1} = \underset{c \in C_{v,1}}{\operatorname{argmax}} \|u_1^H c\|^2,$$

where $C_{h,1}$ denotes a codebook for quantization of $v_1$, $C_{v,1}$ denotes a codebook for quantization of $u_1$, c denotes a codeword, $\hat{c}_{h,1}$ denotes a codeword selected based on a result of the quantization of $v_1$, and $\hat{c}_{v,1}$ denotes a codeword selected based on a result of the quantization of $u_1$, $C_{h,1}$ and $C_{v,1}$ being included in the second codebook.

8. The method of claim 6, wherein the quantizing of the channel state information using the third codebook based on the result of the quantization using the second codebook uses an equation of $$\hat{c}_{h,2} = \underset{c \in C_{h,2}}{\operatorname{argmax}} \left\| u_1^H \frac{\hat{c}_{h,1} + c}{\|\hat{c}_{h,1} + c\|} \right\|^2$$

$$\hat{c}_{v,2} = \underset{c \in C_{v,2}}{\operatorname{argmax}} \left\| u_1^H \frac{\hat{c}_{v,1} + c}{\|\hat{c}_{v,1} + c\|} \right\|^2,$$

where $\hat{c}_{h,1}$ and $\hat{c}_{v,1}$ denote codewords selected based on a result of the quantization using the second codebook, $C_{h,2}$ denotes a codebook for the quantization of $v_1$, $C_{v,2}$ denotes a codebook for the quantization of $u_1$, $\hat{c}_{h,2}$ denotes a codeword selected based on a result of the quantization of $v_1$, and $u_1$ denotes a codeword selected based on a result of the quantization of $u_1$, $C_{h,2}$ and $C_{v,2}$ being included in the third codebook.

9. A reception device in a wireless communication system, the reception device comprising:
a transceiver; and
at least one processor operatively coupled with the transceiver,
wherein the at least one processor is configured to control to:
determine channel state information;
perform first quantization on the channel state information using a first codebook,
perform second quantization on the channel state information using a second codebook and a third codebook which are different from the first codebook,
select one of the first quantization and the second quantization based on a number of dominant beam patterns, and
transmit the channel state information based on the selection of the one of the first quantization and the second quantization.

10. The reception device of claim 9, wherein the at least one processor is further configured to decompose the channel state information into a first component $u_1$ and a second component $v_1$ based on a Kronecker product,
wherein the first component $u_1$ is a matrix including information on a vertical domain of a total channel vector h and the second component $v_1$ is a matrix including information on a horizontal domain of the total channel vector h.

11. A transmission device in a wireless communication system, the transmission device comprising:
a transceiver; and
at least one processor operatively coupled with the transceiver,
wherein the at least one processor is configured to control to receive channel state information, and
wherein the channel state information is determined through a process of performing first quantization on the channel state information using a first codebook, performing second quantization on the channel state information using a second codebook and a third codebook which are different from the first codebook, and selecting one of the first quantization and the second quantization based on a number of dominant beam patterns.

12. The transmission device of claim 11, wherein the second quantization includes quantization using the second codebook and quantization using the third codebook based on a result of the quantization using the second codebook.

13. The reception device of claim 10, wherein the at least one processor is configured to control to quantize each of the first component $u_1$ and the second component $v_1$.

14. The reception device of claim 10, wherein the selection of one of the first quantization and the second quantization is performed with respect to each of $u_1$ and $v_1$, and is determined based on the dominant beam patterns of $u_1$ and $v_1$.

15. The reception device of claim 10, wherein the first quantization uses an equation of $$\hat{c}_h = \underset{c \in C_h}{\operatorname{argmax}} \|v_1^H c\|^2$$

$$\hat{c}_v = \underset{c \in C_v}{\operatorname{argmax}} \|u_1^H c\|^2,$$

where $C_h$ denotes a codebook for quantization of $v_1$, $C_v$ denotes a codebook for quantization of $u_1$, c denotes a codeword, $\hat{c}_h$ denotes a codeword selected based on a result of the quantization of $v_1$, and $\hat{c}_v$ denotes a codeword selected based on a result of the quantization of $u_1$, $C_h$ and $C_v$ being included in the first codebook.

16. The reception device of claim 10, wherein the at least one processor is configured to control to:
quantize the channel state information using the second codebook, and
quantize the channel state information using the third codebook based on a result of the quantization using the second codebook.

17. The reception device of claim 16, wherein the at least one processor is configured to control to quantize the channel state information using the second codebook based on an equation of $$\hat{c}_{h,1} = \underset{c \in C_{h,1}}{\operatorname{argmax}} \|v_1^H c\|^2$$

$$\hat{c}_{v,1} = \underset{c \in C_{v,1}}{\operatorname{argmax}} \|u_1^H c\|^2,$$

where $C_{h,1}$ denotes a codebook for quantization of $v_1$, $C_{v,1}$ denotes a codebook for quantization of $u_1$, c denotes a codeword, $\hat{c}_{h,1}$ denotes a codeword selected based on a result of the quantization of $v_1$, and $\hat{c}_{v,1}$ denotes a codeword selected based on a result of the quantization of $u_1$, $C_{h,1}$ and $C_{v,1}$ being included in the second codebook.

18. The reception device of claim 16, wherein the at least one processor is configured to control to quantize the channel state information based on an equation of $$\hat{c}_{h,2} = \underset{c \in C_{h,2}}{\text{argmax}} \left\| u_1^H \frac{\hat{c}_{h,1} + c}{\|\hat{c}_{h,1} + c\|} \right\|^2$$

$$\hat{c}_{v,2} = \underset{c \in C_{v,2}}{\text{argmax}} \left\| u_1^H \frac{\hat{c}_{v,1} + c}{\|\hat{c}_{v,1} + c\|} \right\|^2,$$

where $\hat{c}_{h,1}$ and $\hat{c}_{v,1}$ denote codewords selected based on a result of the quantization using the second codebook, $C_{h,2}$ denotes a codebook for the quantization of $v_1$, $C_{v,2}$ denotes a codebook for the quantization of $u_1$, $\hat{c}_{h,2}$ denotes a codeword selected based on a result of the quantization of $v_1$, $u_1$ and denotes a codeword selected based on a result of the quantization of $u_1$, $C_{h,2}$ and $C_{v,2}$ being included in the third codebook.

* * * * *